(12) United States Patent
Bank

(10) Patent No.: US 9,146,106 B2
(45) Date of Patent: Sep. 29, 2015

(54) LASER RECEIVER USING A SMART DEVICE

(71) Applicant: Trimble Navigation Limited, Sunnyvale, CA (US)

(72) Inventor: Michael David Bank, Beavercreek, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 92 days.

(21) Appl. No.: 14/103,545

(22) Filed: Dec. 11, 2013

(65) Prior Publication Data

US 2015/0160009 A1 Jun. 11, 2015

(51) Int. Cl.
G01C 15/02 (2006.01)
G01C 15/06 (2006.01)
G01C 15/00 (2006.01)

(52) U.S. Cl.
CPC .............. *G01C 15/06* (2013.01); *G01C 15/002* (2013.01)

(58) Field of Classification Search
CPC .............................. G01C 15/06; G01C 15/002
USPC ............................................ 33/290, 293–296
See application file for complete search history.

(56) References Cited

U.S. PATENT DOCUMENTS

| | | | |
|---|---|---|---|
| 5,343,033 A | 8/1994 | Cain | |
| 5,471,049 A | 11/1995 | Cain | |
| 5,486,690 A | 1/1996 | Ake | |
| 6,388,743 B1 | 5/2002 | Aharon | |
| 6,398,175 B1 | 6/2002 | Conner | |
| 7,012,237 B1 | 3/2006 | Ake | |
| 7,409,312 B2 | 8/2008 | Conner | |
| 7,414,704 B1 | 8/2008 | Nau | |
| 8,087,176 B1 | 1/2012 | Hayes | |
| 8,319,950 B2 | 11/2012 | Snyder | |
| 2007/0044536 A1* | 3/2007 | Gunsaulis et al. | 73/1.79 |
| 2008/0015811 A1* | 1/2008 | Conner et al. | 702/159 |
| 2010/0131237 A1* | 5/2010 | Pamatmat | 702/159 |
| 2010/0225896 A1* | 9/2010 | Wolf et al. | 356/4.01 |
| 2012/0272536 A1* | 11/2012 | Nishita | 33/290 |
| 2013/0276315 A1* | 10/2013 | Kahle | 33/228 |
| 2014/0081571 A1* | 3/2014 | Briggs et al. | 701/491 |
| 2014/0338205 A1* | 11/2014 | Dumoulin | 33/228 |
| 2015/0056369 A1* | 2/2015 | Kohn | 427/137 |
| 2015/0116693 A1* | 4/2015 | Ohtomo et al. | 356/4.01 |

OTHER PUBLICATIONS

ISA "Annex" with Preliminary International Search Report (Mar. 25, 2015) [Please note: the true International Search Report is still not available.].

* cited by examiner

*Primary Examiner* — G. Bradley Bennett
(74) *Attorney, Agent, or Firm* — Frederick H. Gribbell; Aaron S. Brodsky

(57) ABSTRACT

A smart device is disclosed which contains a digital camera with an active electronic viewscreen that displays the detected image, in which the camera can sense laser light beams. The smart device has the capability receiving and executing an application program that allows the camera to be used as a grade elevation detector, in which the camera can sense a laser light beam that effectively forms a plane of laser light which defines an "on-grade" elevation for a jobsite. The user can determine this on-grade elevation by running the APP and viewing the display screen to find the (rotating or static) laser beam. An automated APP system can capture the on-grade elevation using a sequence of images that include a grade rod measurement paired with laser beam intensity detection images.

24 Claims, 10 Drawing Sheets

LASER RECEIVER USING A SMART DEVICE

TECHNICAL FIELD

The technology disclosed herein relates generally to laser light detecting equipment and is particularly directed to a smart device of the type which contains a digital camera with an active electronic viewscreen that displays the detected image, in which the camera can sense laser light beams. Embodiments are specifically disclosed as a digital smart device that has the capability receiving and executing an application program (an "APP") that allows the camera to be used as a grade elevation detector, in which the camera can sense a rotating (or static) laser light beam that effectively forms a plane of laser light which prescribes an "on-grade" elevation for a jobsite, and the user can determine this on-grade elevation by running the APP and viewing the display screen to find the (rotating or static) laser beam.

Another embodiment of this technology uses a smart device that contains two digital cameras, a first one mounted to a first surface that faces away from the user who is holding the smart device, and a second camera mounted to a second surface that faces in a different, usually opposite, direction. The first camera is used to detect the (rotating or static) laser beam, while the second camera views a grade rod held at a point of interest on the jobsite surface (e.g., on a floor of a building under construction). Once the user detects the on-grade elevation, the second camera can take a photograph of the grade rod to record the numeric value (as depicted as linear indicia on that grade rod) of the actual on-grade level, with respect to that grade rod, at the point of interest.

Another embodiment of this technology uses sensors to assist the user in correctly positioning the smart device while running the APP to find the on-grade elevation. Yet another embodiment of this technology uses different sensors, with appropriate displays on the smart device, to assist the user in positioning the smart device correctly while correcting for inaccuracies in holding the device with respect to the tilt angle and/or the pitch angle.

STATEMENT REGARDING FEDERALLY SPONSORED RESEARCH OR DEVELOPMENT

None.

BACKGROUND

There are many electronic devices that have digital cameras with relatively large displays for a user to perceive the image that is being seen by the digital camera. This includes smart phones, or other types of iPOD-type devices, and also certain types of tablet computers. Such devices could be used to detect a laser beam, including visible laser light in either the red or green spectra. Also some digital cameras are sensitive enough to perceive infrared lasers and can give a certain visible output when receiving infrared laser signals, as well.

The width of the laser beam needs to be considered; typical laser transmitters used for indicating on-grade elevation on construction jobsites have a width in the range of two millimeters to five millimeters. The size of the lens for most digital cameras on smart phones and iPODs is about the same size, so there will need to be some type of special software to help in determining the center of the beam density. An application program that can be loaded onto the smart phone (or other smart device) will be needed to assist the user in determining the position of the laser beams, and such an APP program can also be used to provide other very useful optional features.

SUMMARY

Accordingly, it is an advantage to provide a smart device that contains an electronic camera with an electronic viewfinder that can run an application program and be used as an effective laser receiver by detecting a laser beam emitted by a laser transmitter, and then to determine an on-grade elevation, as produced by that laser transmitter.

It is another advantage to provide a smart device with a digital camera and an electronic viewfinder for finding an on-grade elevation produced by a laser transmitter and holding the smart device at the on-grade elevation and using a physical feature of the smart device as a reference position for marking a position on the physical jobsite to indicate a relative on-grade elevation.

It is a further advantage to provide a smart device with a digital camera and an electronic viewfinder that can be used to determine the on-grade elevation produced by a laser transmitter, and to provide at least one sensor that can determine if the smart device is being moved up, down, or is being held still, and from those set of inputs, to output an indication to inform the user if the smart device is above grade, below grade, or on-grade.

It is a further advantage to provide a smart device with a digital camera and an electronic viewfinder that can be used to determine the on-grade elevation produced by a laser transmitter, and to provide at least one sensor that can determine if the smart device is being moved up, down, or is being held still, and from that set of inputs, to output an indication to inform the user if the smart device is above grade, below grade, or on-grade, and for the sensors to determine the tilt angles, in which the application program can produce displays or audio output signals to assist the user in correcting for errors in the tilt angle grade.

It is yet a further advantage to provide a smart device with a first digital camera and an electronic viewfinder, and also a second digital camera that is pointed in a different direction from the first camera, in which the smart device is aimed at a laser transmitter on a construction jobsite, and the second camera is aimed at a grade rod that is placed on the surface of the construction jobsite at a particular point of interest, and then the smart device is moved vertically to the on-grade laser plane elevation as produced by the laser transmitter; when in such position, the human user causes the second camera to take an image of the grade rod, thereby memorializing the elevation of the grade rod at the on-grade elevation produced by the laser transmitter.

It is still a further advantage to provide a smart device with a first digital camera and an electronic viewfinder, and also a second digital camera that is pointed in a different direction from the first camera, in which the smart device is aimed at a laser transmitter on a construction jobsite, and the second camera is aimed at a grade rod (or any other type of angular or linear indicating or measuring device) that is placed on a surface, or against a structure, at the construction jobsite at a particular point of interest, and then the smart device is moved horizontally to the desired vertical laser plane direction line (or bearing) as produced by the laser transmitter; when in such position, the human user causes the second camera to take an image of the grade rod, thereby memorializing the direction (e.g., as a "bearing" or as an offset distance) of the grade rod at the desired direction line produced by the laser transmitter.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a computer system used for determining an on-grade elevation on a jobsite is provided, which comprises: (a) a smart device, having a processing circuit, a memory circuit, an input/output circuit, an electronic camera with a plurality of photosensors, an electronic viewfinder that is visible to a human user, at least one sensor for detecting physical movement of the smart device, and at least one of a display or an audio output device; (b) a laser transmitter that emits at least one laser beam in at least one predetermined direction, and creates an effective plane of laser light at an elevation which is defined as being On-Grade; (c) wherein: while the human user attempts to place the smart device in a location so as to intercept the effective plane of laser light, the processing circuit is configured to display an image on the electronic viewfinder, based on electromagnetic radiation signals that impact the electronic camera, and the image is viewable by the human user to provide a coarse position for placing the smart device within the effective plane of laser light; and (e) wherein: the processing circuit is further configured to determine if the effective plane of laser light is impacting the electronic camera at a more fine position, and if so, based upon a first signal from the at least one sensor, to determine if the smart device is moving up, down, or is being held still, and if the smart device is physically held still at the On-Grade elevation, then to indicate that the smart device is On-Grade, using the at least one of a display or an audio output device.

In accordance with another aspect, a computer system used for determining an on-grade elevation on a jobsite is provided, which comprises: (a) a smart device, having a processing circuit, a memory circuit, an input/output circuit, a first electronic camera with a plurality of photosensors, a second electronic camera with a plurality of photosensors, an electronic viewfinder that is visible to a human user, and a user-controlled input device, wherein the first electronic camera is mounted on the smart device so as to face in a first direction and the second electronic camera is mounted on the smart device so as to face in a second direction in which the first direction is different than the second direction; (b) a laser transmitter that emits at least one laser beam in at least one predetermined direction, and creates an effective plane of laser light at an elevation which is defined as being On-Grade; (c) a grade rod having visible graduations along its longitudinal axis, the grade rod being placed at the jobsite on the opposite side of the smart device from the laser transmitter; (d) wherein: while the human user attempts to place the smart device in a location and first orientation so as to intercept the effective plane of laser light, the processing circuit is configured to display an image on the electronic viewfinder, based on electromagnetic radiation signals that impact the first electronic camera, and the image is viewable by the human user to provide a position for placing the smart device within the effective plane of laser light, which will be designated as an On-Grade position; (e) wherein: while maintaining the smart device in the first orientation, upon activation of the user-controlled input device by the human user, the processing circuit is further configured to: (i) receive a signal from the user-controlled input device, (ii) then to activate the second electronic camera which acquires an image of the grade rod, and (iii) to store the image in the memory circuit.

In accordance with yet another aspect, a method for determining an on-grade elevation on a jobsite is provided, in which the method comprises the following steps: (a) providing a smart device, having a processing circuit, a memory circuit, an input/output circuit, an electronic camera with a plurality of photosensors, an electronic viewfinder that is visible to a human user, an output device that is (i) visible, or (ii) audible, or (iii) visible and audible, and an outer housing having a physical feature for visibly indicating a predetermined elevation with respect to the electronic camera; (b) providing a laser transmitter that emits at least one laser beam in at least one predetermined direction, and thereby creates an effective plane of laser light at an elevation which is defined as being On-Grade; (c) attempting to place the smart device in a location so as to intercept the effective plane of laser light, by: (i) displaying, under the control of the processing circuit, an image on the electronic viewfinder, based on electromagnetic radiation signals that impact the electronic camera; and (ii) viewing the image so as to provide a coarse position for placing the smart device within the effective plane of laser light; and (d) moving the smart device in smaller distance increments so as to find a more fine position where the effective plane of laser light is impacting the electronic camera, by: (i) while viewing the image on the electronic viewfinder, slowly moving the smart device up and down until centering the effective plane of laser light onto the camera, as determined by the human user; (ii) holding the smart device still after the smart device has been centered, and designating that position as being On-Grade; and (e) using the physical feature of the outer housing of the smart device as a reference position, and marking that position on the jobsite to thereby indicate a relative On-Grade elevation.

In accordance with another aspect, a computer system used for determining an on-grade elevation on a jobsite is provided, which comprises: (a) a laser transmitter that emits at least one laser beam in at least one predetermined direction, and creates an effective plane of laser light at an elevation which is defined as being On-Grade; (b) a grade rod having visible graduations along its longitudinal axis, the grade rod being placed at a user-selected point of interest of the jobsite; and (c) a smart device, having a processing circuit, a memory circuit, an input/output circuit, a first electronic camera with a plurality of photosensors, and a second electronic camera with a plurality of photosensors, wherein the first electronic camera is mounted on the smart device so as to face in a first direction and the second electronic camera is mounted on the smart device so as to face in a second direction, in which the first direction is different than the second direction; (d) wherein: a user holds the smart device such that the first direction is generally facing the laser transmitter and the second direction is generally facing the grade rod; (e) wherein the processing circuit is configured: (i) to detect a Start command; (ii) using the first and second electronic cameras, to initiate a sequence by photographing a plurality of images while the user moves the smart device through the effective plane of laser light; (iii) to create a plurality of paired images, such that each image taken by the first electronic camera is paired with a corresponding image taken in near-real time by the second electronic camera; (iv) to measure an intensity of each of the plurality of images taken by the first electronic camera, and to determine which of the first electronic camera images had a maximum value of intensity as compared to all other of the first electronic camera images; (v) to select the first electronic camera image which exhibited the maximum value of intensity, along with its corresponding paired second electronic camera image showing the grade rod, and designating those images as an On-Grade pair; (vi) from the On- Grade pair of images, to store the second electronic camera image in the memory circuit; and (vii) to terminate the sequence of photographing the plurality of images.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

In FIG. 11, the procedure is automated by having the two cameras take multiple images of both the laser beam and the grade rod, so that when the laser beam on-grade position is determined, there will be a corresponding (and virtually simultaneous) image taken of the grade rod, which becomes the on-grade image of interest for this point on the jobsite.

DETAILED DESCRIPTION

Figure 1:
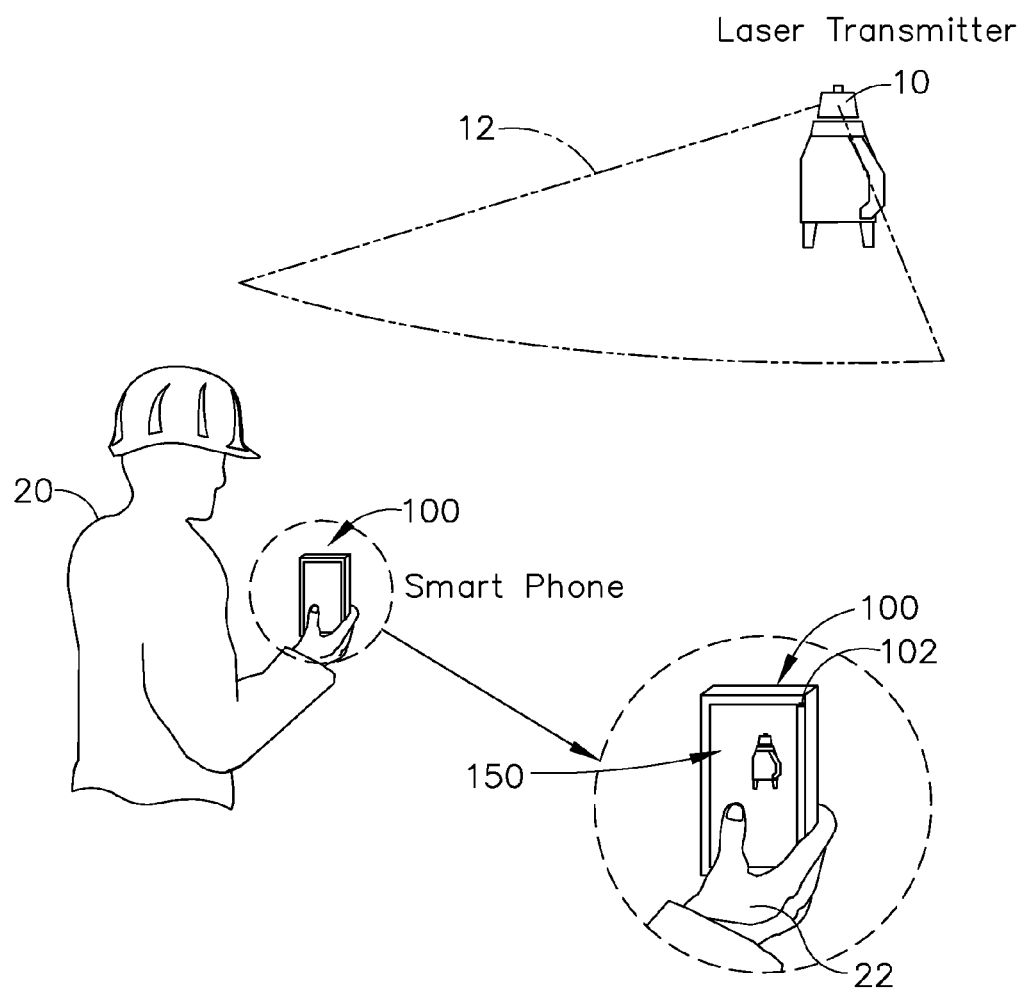
FIG. 1 is a diagrammatic perspective view of a construction jobsite, showing a laser transmitter emitting a rotating beam of laser light to create a laser plane, a smart device with a digital camera that is being held by a user on the jobsite floor, in which the smart device is running a computer application program for detecting the rotating beam of laser light, as according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a portion of a construction job site is depicted, in which a rotating laser transmitter is illustrated at reference numeral 10, which outputs a thin laser light beam that quickly rotates, thereby creating an effective plane of laser light at 12. (Note: a laser light fan beam could be used, instead.) A human user at 20 is standing off to the side of the laser transmitter 10, and is holding a smart device, which is illustrated on FIG. 1 as being a "smart phone," generally designated by the reference numeral 100. This smart phone could just as easily be another type of smart device, such as an iPOD-device. The important thing about the device 100 is that it can accept and execute an application program on its processing unit (typically a microprocessor or a microcontroller), and that it has a digital camera with an active electronic viewfinder.

The magnified view insert of FIG. 1 depicts the smart device in greater detail. Smart device 100 has an electronic display 150, which acts as a viewfinder, so the human user can view what the digital camera sees. In this view, the user is holding the smart device 100 in his right hand 22. Another feature of the smart device 100 is a reference line or notch at the numeral 102, which will be explained in greater detail below.

The technology disclosed herein will assist the user 20 in the finding the "on-grade" elevation that is being defined by the plane of laser light 12 being emitted by laser transmitter 10. In effect, the smart device 100, which can be a smart phone with a digital camera, is being used as a laser receiver for construction jobsite applications. As the camera lens is passed through the collimated laser beam of a rotating (or fan beam) laser transmitter, there is a gradual increase, then a peak, and then a gradual decrease in the image brightness on the electronic display 150. The application program will be used to process this image to determine the center of energy of the laser beam, which thereby allows the user to find the on-grade position of the smart device with respect to laser plane 12.

In addition to the basic features of the technology disclosed herein, there can be some optional features as well, such as built-in sensors for determining either tilt angles or physical movements of the smart device; in addition, an optical filter could be added if desired. Also, a case for the unit could be added to provide a physical "marking notch" feature that will be visible to the user when using the smart device 100. The marking notch feature is generally illustrated at the reference numeral 102.

Figure 2:
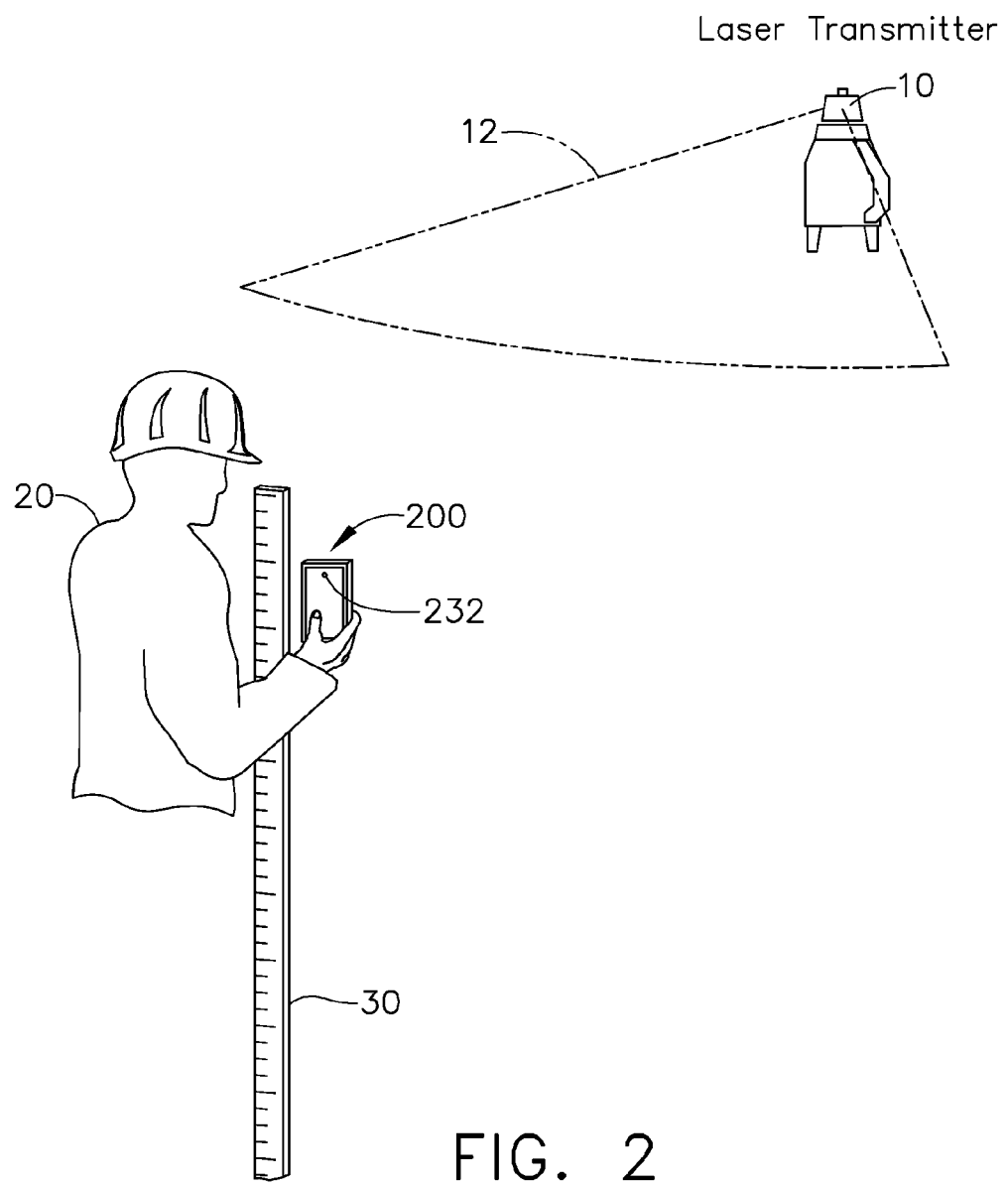
FIG. 2 is a diagrammatic perspective view of a construction jobsite, showing a laser transmitter emitting a rotating beam of laser light to create a laser plane, a smart device with two cameras that is being held by a user on the jobsite floor, and a grade rod, in which the smart device is running a computer application program for detecting the rotating beam of laser light and then recording the grade level with respect to the grade rod, as according to the principles of the technology disclosed herein. The two cameras point in different directions, in which the first camera faces the laser transmitter, and the second camera faces the grade rod.

Referring now to FIG. 2, a second embodiment of the technology disclosed herein is provided, again for use on a construction jobsite. The laser transmitter 10 is again used, and in this illustration, it emits a rotating laser beam (or fan beam) that creates a plane of laser light at 12. The human user 20 is now holding another smart device at 200, and also is holding a grade rod 30. This is a second embodiment of the smart device, because it includes not only a forward facing camera, but also a rearward facing camera at 232. Many smart phones available today already have two such cameras, one for photographing an image as selected by the user, and one that points back at the users' face, so the user can transmit his (or her) own image along with transmitting other image data while making a telephone call using a cellular phone connection.

Figure 3:
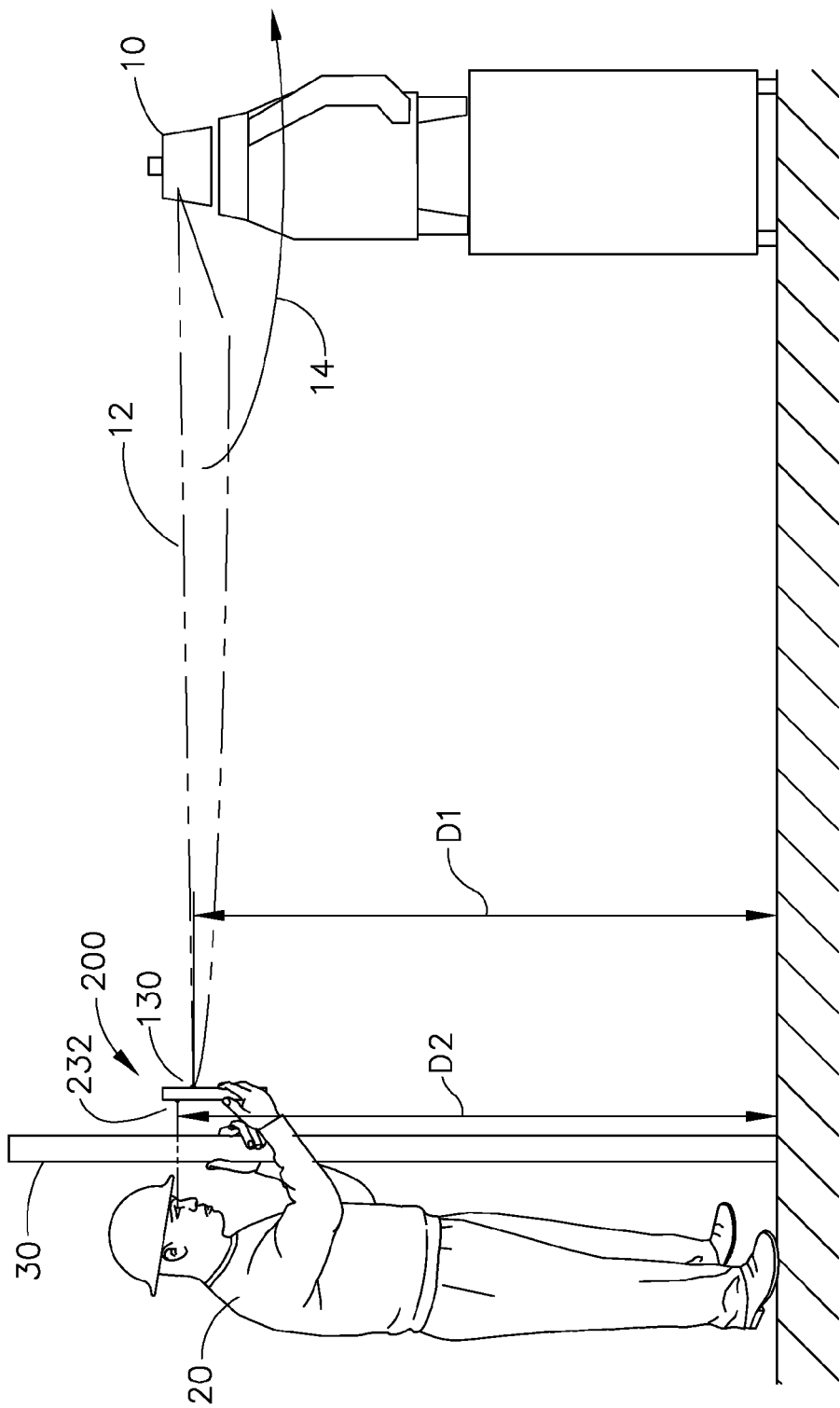
FIG. 3 is a diagrammatic elevational view of the jobsite of FIG. 2, showing the laser transmitter with its laser plane, the smart device being held by the user, and the grade rod also being held by the user, with the first camera of the smart device being used to detect the on-grade elevation of the laser plane and the second camera of the smart device being used to record the grade level by taking a photograph of the grade rod's graduation markings at the appropriate time.

Referring now to FIG. 3, this is side view of the situation depicted in FIG. 2. In this example, the laser transmitter has a rotating beam that rotates in the direction depicted by the reference numeral 14. The plane of laser light is again depicted at the reference numeral 12, and the user 20 is holding the smart device 200 at an elevation so that the forward-facing digital camera at 130 is intersecting the laser beam (or laser plane) 12, and this places the camera 130 at an elevation or height above the ground surface at a distance "D1." Of course, the user has to perform certain steps to arrive at the proper location for holding the smart device 200 at this position, but once that position has been achieved, the camera 130 will be above the ground level by that distance D1.

The user is holding the grade rod 30 in his left hand while simultaneously holding the smart device 200 in his right hand. As noted above in discussing FIG. 2, the smart device 200 has a second digital camera at 232. In this embodiment, that digital camera 232 is rearward-facing while the first camera 130 is forward-facing. Since the two cameras 130 and 232 are typically not at the same elevation on most smart phones, there will be a difference in elevation between the positions of the first camera 130 and the second camera 232. The distance designated "D2" on FIG. 3 represents the distance above the ground elevation (or floor elevation) of this jobsite with respect to the position of the second camera 232. As can easily be seen when viewing FIG. 3, the elevation of the second camera 232 is not exactly the same as the elevation of the first camera 130, so an adjustment must be made when calculating the on-grade numeric value with respect to the grade rod.

Since the smart device 200 has two separate cameras, the first camera 130 can be facing the laser transmitter 10 and be intercepting the on-grade laser beam 12 while at the same time the second camera 232 can be facing the grade rod 30. Once the smart device 200 is at the proper on-grade elevation, the user 20 can press a button on smart device 200 and have it take a digital photograph using the second camera 232. This digital photograph will create an image of the grade rod, and with some image processing, the smart device 200 can determine the numeric value on the gradations of the grade rod with respect to the on-grade elevation at the laser plane 12. This will automatically take into account the difference between the distances D1 and D2. In addition, if there are any tilt-angle corrections to be made, such corrections can be made with an enhanced version of the smart device 200, as will be described below.

As can be seen in both FIGS. 2 and 3, the grade rod 30 would typically be held in a proximal manner to the smart device 200. There is no particular restriction on the exact distances involved, but it would be best if the grade rod and smart device are both within a person's arm length, so that a single user can accomplish this methodology; but of course, that is not a requirement. Another consideration is that the grade rod's gradations should be in focus for the second camera 232. This should not be a huge problem, as most smart phones have digital cameras that can focus at very close distances.

Figure 4:
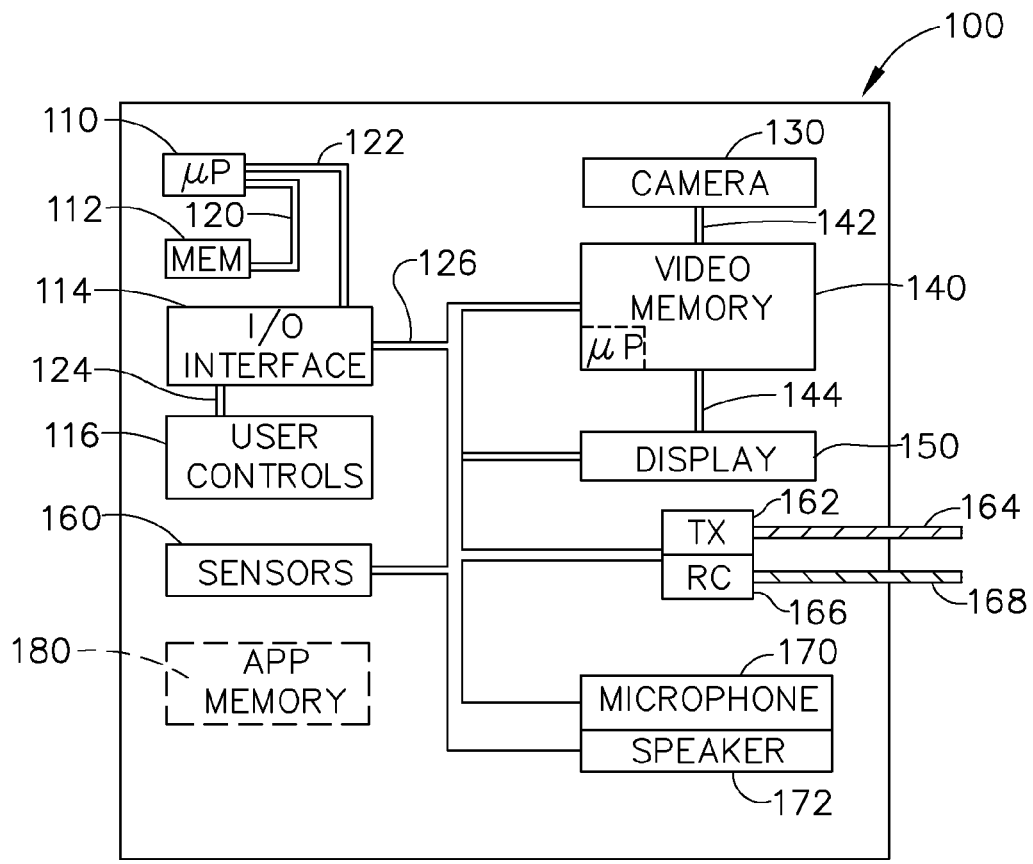
FIG. 4 is a block diagram of some of the major hardware components of a smart device of a first embodiment that includes a digital camera with a display that operates as an active electronic viewfinder. The camera detects the laser light beam of the laser transmitter of FIG. 1, as is used to determine the on-grade elevation of that laser plane. The smart device includes sensors and, for this application, the sensors are accelerometers that can be used in two ways: (1) to determine what vertical direction the smart device is being moved by the human user during the procedure for finding the on-grade elevation position of the laser plane; and (2) to correct for errors in the tilt angle of the smart device, while it is being used to determine the on-grade position.

Referring now to FIG. 4, a block diagram of some of the major hardware components of a smart device of a first embodiment is depicted, generally designated by the reference numeral 100. The smart device has a processing circuit at 110, typically a microprocessor or a microcontroller. An associated memory circuit is depicted at 112, and there is an address and data bus 120 connecting the memory circuit to the processing circuit. An input/output (I/O) interface circuit is provided at 114, and it has an address and data bus at 122, which could be part of the main system address and data bus, but perhaps with special signal lines carrying data from the I/O interface circuit 114. The I/O interface circuit 114 is used to communicate with external devices, such as sensors or user manipulated input controls, and will convert that data to voltage and current signals that are compatible with the microprocessor circuit 110; those signals are transferred through the bus 122.

A set of user manipulated controls is provided at 116, and those controls are typically either individual pushbutton switches, or if the smart device has a touch screen display, then the touch screen display will have its own interface circuit that will provide signals emulating the user controls at 116. Those signals are transferred to the I/O interface circuit 114 via a bus of signal lines 124. The I/O interface 114 will also communicate with many other devices, via a type of data/signal bus 126. These other devices include a digital camera 130, a video memory circuit 140, a display 150, a microphone 170, and a speaker 172. In addition, if the smart device is a type of cellular telephone, there will be a transmitter circuit 162 and a receiver circuit 166 that also will transfer signals to the I/O interface circuit 114.

The video memory 140 could be part of the main system memory 112, if that is how the smart device has been designed. Alternatively, the video memory 140 could be a separate memory circuit, and it may be controlled by a separate microprocessor, as is depicted on FIG. 4. The video memory, or a similar circuit by another name, will capture the image data from the digital camera 130, which is transferred to the video memory by a data bus 142. At the same time, the video memory circuit 140 can also be used to store the data that will be uploaded to the display 150, via a signal bus 144. Note that, if the smart device has a powerful enough processing circuit 110 and large enough memory circuit 112, the video memory as an independent device may not be necessary, and the camera and display interface buses 142 and 144 could be connected directly to the I/O interface bus 126, or perhaps directly into the microprocessor's main data and address bus 120.

If the smart device includes a cellular telephone capability, the transmitter circuit 162 will be connected to an antenna 164, and the receiver circuit 166 will be connected to an antenna 168. The two antennae might be designed as a single device, combining the two depicted antennae 164 and 168. Most cellular telephones include a microphone 170 and a speaker 172, and the APP computer program could be used to accept voice commands from the microphone. Moreover, some of the output data could be rendered into an audio signal and presented to the speaker 172, which could also be used in conjunction with displaying data visually on the display 150.

The special application program could be stored in a separate APP memory circuit 180, as depicted on FIG. 4. Whether or not a separate memory circuit 180 is needed, or even desired, will be up to the designer of the smart device. Such a memory circuit could be combined into the overall main system memory circuit 112, if desired. However, it will be understood that the "APP memory circuit," whether it is a separate electronic circuit or its programming is physically being stored as part the main system memory, will be used to receive special or custom application programs that are not part of the main operating system of the smart device that typically resides in the main system memory circuit 112. Instead, the APP memory circuit will be used to store such custom APP programs, including APP programs that might be available from other sources and have nothing to do with detecting laser transmitter light beams. In this description, however, when referring below to the "APP" it will be in reference to the special application program that will take a "standard" smart device and essentially make it into a laser receiver device.

Figure 5:
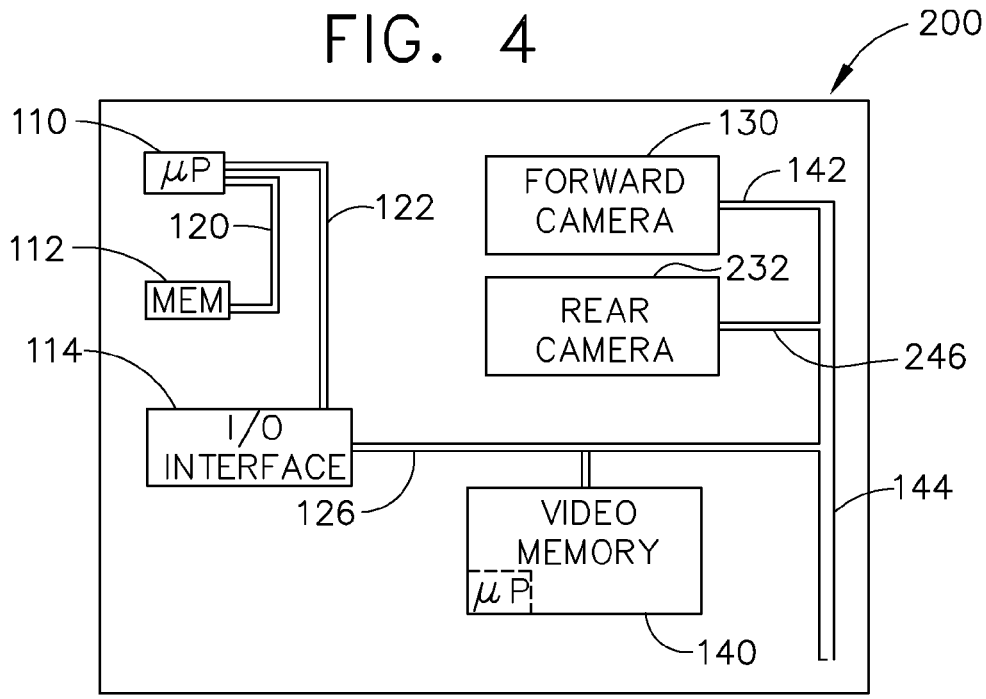
FIG. 5 is a partial block diagram of some of the major hardware components of a smart device of a second embodiment that includes a first digital camera (the "forward camera") with a display that operates as an active electronic viewfinder, and which includes a second digital camera (the "rear camera") facing substantially in the opposite direction from the first camera. The other smart device components are similar to that of FIG. 4, including a display that operates as an active electronic viewfinder. The first camera faces the laser transmitter, and the second camera faces the grade rod; the first camera is used to detect the on-grade elevation of the laser plane and the second camera of the smart device is used to record the grade level by taking a photograph of the grade rod's graduation markings.

Referring now to FIG. 5, a partial block diagram of some of the major hardware components of a second embodiment smart device is provided, in which this second embodiment smart device is generally designated by the reference numeral 200. As would be expected, there is a system processing circuit 110 and a main system memory circuit 112, again connected by an address and data bus 120. There also is an I/O interface circuit 114, again connected by a data or signal bus 122 to the processing circuit. The I/O interface circuit 114 again has a signal bus 126 that is connected to several external devices, including sensors of one type or another. The bus 126 is connected to a bus that extends downward (off the figure, in essence) designated by the reference numeral 144, and this data/signal bus extends to many of the other devices that are depicted on the first embodiment smart device 100 on FIG. 4. Such other devices include user controls, sensors, a display, a microphone and speaker, and a cellular phone transmitter and receiver circuit, as desired to make the second embodiment smart device fully capable.

The main difference between the smart device 200 and smart device 100 is that there is a second digital camera 232 in the second embodiment smart device 200. As depicted on FIG. 5, the I/O interface bus 126 is connected to a forward camera 130 via signal bus 142; but in addition, a rear camera 232 is also connected to the interface bus 126, via another signal bus 246. In addition, there is another video memory circuit 140, perhaps with its own processing circuit, if this type of separate video memory circuit is desired for the smart device capabilities, again as determined by the designer of the smart device. The video memory circuit 140 is depicted on FIG. 5, and, again if designed into the smart device 200, it can be used to initially store images that are captured by the forward camera 130 and by the rear camera 232. Those images will ultimately be transferred to a display (such as the display 150 that is depicted on FIG. 4), and that image data will be under the control of the system microprocessor 110 in a typical smart device.

This second embodiment smart device 200 is the one described in reference to the diagrammatic views of FIGS. 2 and 3. In general, the forward camera 130 will be aimed at the laser transmitter 10, and the rear camera will be aimed at the grade rod 30. There are existing smart phones that have two cameras on them already, and usually those cameras are pointed in opposite directions, so that the user can take a digital photograph while pointing his or her smart phone toward an object of interest, and at the same time have the second (rearward-facing) digital camera facing toward the user himself or herself, so that the user's face can also be imaged and stored. However, it will be understood that the forward-facing and rearward-facing cameras do not necessarily have to be a completely opposite directions (i.e., they do not have to point in directions that are 180 degrees apart from one another), if a special smart device might be designed for this laser receiver application. Of course, in whatever direction the rear camera 232 is actually pointing with respect to the forward camera 130, the grade rod 30 must end up within the view of that second camera 232 while the first camera is being aimed at the laser transmitter 10.

Figure 6:
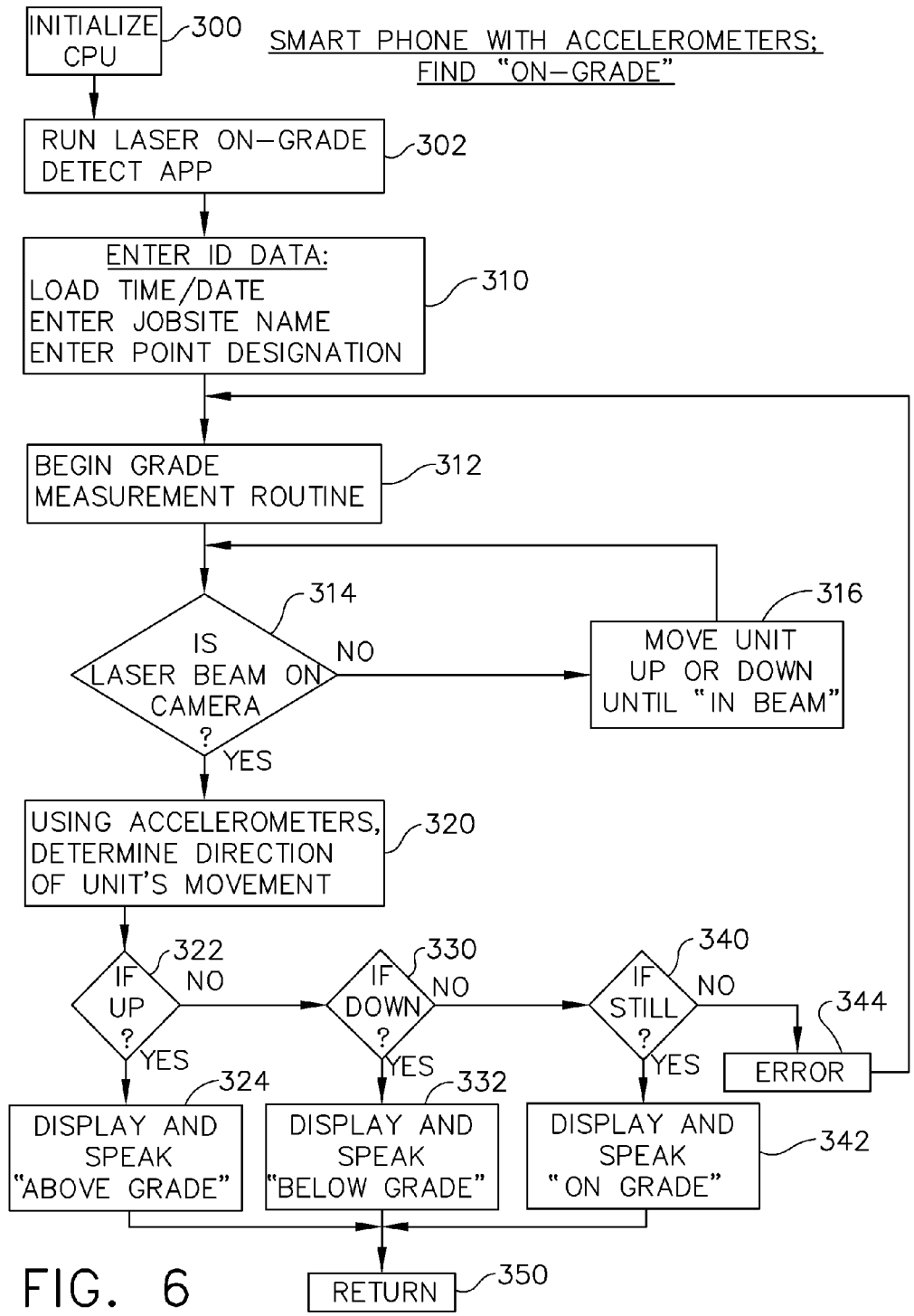
FIG. 6 is a flow chart of some of the important steps performed by a smart device running an application program (an "APP"), in which the smart device of FIG. 4 uses accelerometers, for example, to perform the function of assisting a human user in finding the proper on-grade elevation position of the laser plane being emitted by the laser transmitter of FIG. 1. The accelerometers determine whether the smart device is in motion, either up or down, which information can be used to output an indication as to whether the smart device presently is above grade, below grade, or on-grade.

Referring now to FIG. 6, a flow chart is provided for a routine that is to be used with a smart device that includes accelerometers as sensors. This routine will find the "on-grade" elevation of the laser plane of light being emitted by a laser transmitter on a construction jobsite. Beginning at an initialization step 300 that initializes the processing circuit of the smart device, the next step 302 is to run the APP program for detecting the on-grade laser light. The APP program will now take over the logic flow on FIG. 6.

The next step 310 is for user to enter certain identification data about this particular point of interest. In general, the user will want to load the time and date of this measurement, the jobsite name, and the designation of this particular point of interest. All of this information will be prompted by the APP for the user to enter, at the step 310 in this logic flow. Once that has occurred, a step 312 will begin the grade measurement routine.

At a decision step 314, the user must determine whether or not the laser beam from the laser transmitter 10 is currently on camera. If not, then the user must move the smart device either up or down until the forward-facing camera becomes "in beam" from the laser transmitter. This occurs at a step 316, and once the unit is in beam, the decision step 314 will have the result YES. Once that occurs, the logic flow is directed to a step 320.

At step 320, using sensors, the direction of the unit's movement is detected. Many smart phones or other types of smart devices now include accelerometers that can determine this direction of movement. Once enabled, these create signals that are output from the sensors and sent through the I/O interface, and that information is directed to the processing circuit. The logic flow first reaches a decision step 322, and if the unit is moving up, then a step 324 will display and speak "Above Grade." This result assumes that the user is just first finding the on-grade light beam from the laser transmitter, and is moving the smart device in a relatively coarse manner. Therefore if the accelerometer determines that the smart device is being moved up, by the time the user realizes that he or she has passed through the on-grade beam, the smart device will actually be above the on-grade elevation, and hence the result will be provided as "above grade." A more refined set of movements can provide different results, as discussed below.

If the unit was not moving up at decision step 322, then a decision step 330 determines if the unit was being moved down. If the answer is YES, then a step 332 will display and speak "Below Grade," and for the same reasons as discussed above at step 324, it will be assumed that the user is moving the smart device in a relatively coarse manner, and by the time he or she realizes that the unit has passed through the on-grade laser beam, the smart device will actually be below grade at that point.

If the unit was not being moved down at step 330, then a decision step 340 will determine if the unit is being held still. If so, then a step 342 will display and speak the result "On-Grade." This is the desired result, of course, and after that has been achieved, the logic flow returns from this routine at a step 350. If the answer at decision step 340 is NO, then the logic flow is directed to an error state at a step 342, and the logic flow is directed back to the beginning of the grade measurement routine at step 312, and the routine begins again.

The above description of the logic flow on the flow chart of FIG. 6 portrayed the user as moving the smart device in a rather coarse manner, but in a way, this should probably be referred to as the device being moved in a somewhat "fine" manner, because if the smart phone is moved too abruptly, its small camera will move quickly through the on-grade laser plane so fast that the user will barely realize that it has occurred. In that situation of true coarse movements, the user will likely move the smart device completely through the laser plane too quickly, and the user may not realize that he or she has ended up either above grade or below grade. The accelerometer sensors can help the user, which is the main purpose for the logic of FIG. 6. FIG. 6 is also functional for helping the user determine if the smart device is above or below grade when the user is moving the smart device in a more fine manner, such that the laser transmitter beam might still be touching the digital camera lens face, but not yet on-grade. The user might be able to determine that the camera is within the laser transmitter beam, but may not yet know whether the smart device is above or below grade; the logic flow of FIG. 6 will help the user in that situation.

When the user is now ready to hone in on the on-grade position by moving the smart device in very slow movements, thereby attempting to move the smart device in a more refined set of movements, then the logic results at the bottom of FIG. 6 will become the opposite. Another words, the results at steps 324 and 332 will be changed because the user is moving the smart device in very slow (refined) movement patterns. Therefore, if the accelerometer is determining that the smart device is moving up at decision step 322, that means that the smart device is still just a little below the on-grade elevation, and therefore the result at 324 will be "below grade." Similarly, at decision step 330 if the user is moving the smart device down in a refined (slower) manner, then the result at step 332 will be "above grade." These refined results are an option, and may not be needed once the user has found the laser beam from the laser transmitter, because at that point the user will usually be able to quickly determine where the on-grade position is from strictly visual inputs, by inspecting the image portrayed on the display 150, in real time.

An optional alternative to using accelerometers for finding the correct direction to move the smart device when near the on-grade laser plane is to analyze the pixel data being imaged by the digital camera 130. This will not necessarily be an easy thing to do, because the size of the lens of the digital camera on typical smart phones is quite small. However, the laser plane uses either a laser fan beam or a rotating linear laser beam, and those laser beams themselves are usually fairly small in size, especially at relatively short distances from the laser transmitter 10. Therefore, the energy density of the laser beam impacting the digital camera could be analyzed by image processing software as part of the APP program, and that image data by itself might be useful in determining if the smart device is somewhat above grade or somewhat below grade. In that situation the decision steps 322 and 330 on FIG. 6 could be based upon the image pixel data instead of using accelerometers in step 320. In this alternative embodiment, the step 320 would not actually determine the direction of the smart device's movement, but instead would determine (from the image pixel data) whether the smart device was just a little above grade or below grade, and would give those indications in the respective output steps 324 and 332. Of course, if the unit is perceived as being centered on the density of the laser light signal from the laser transmitter, then the output step 342 would be used to inform the user that the smart device is now on-grade.

Figure 7:
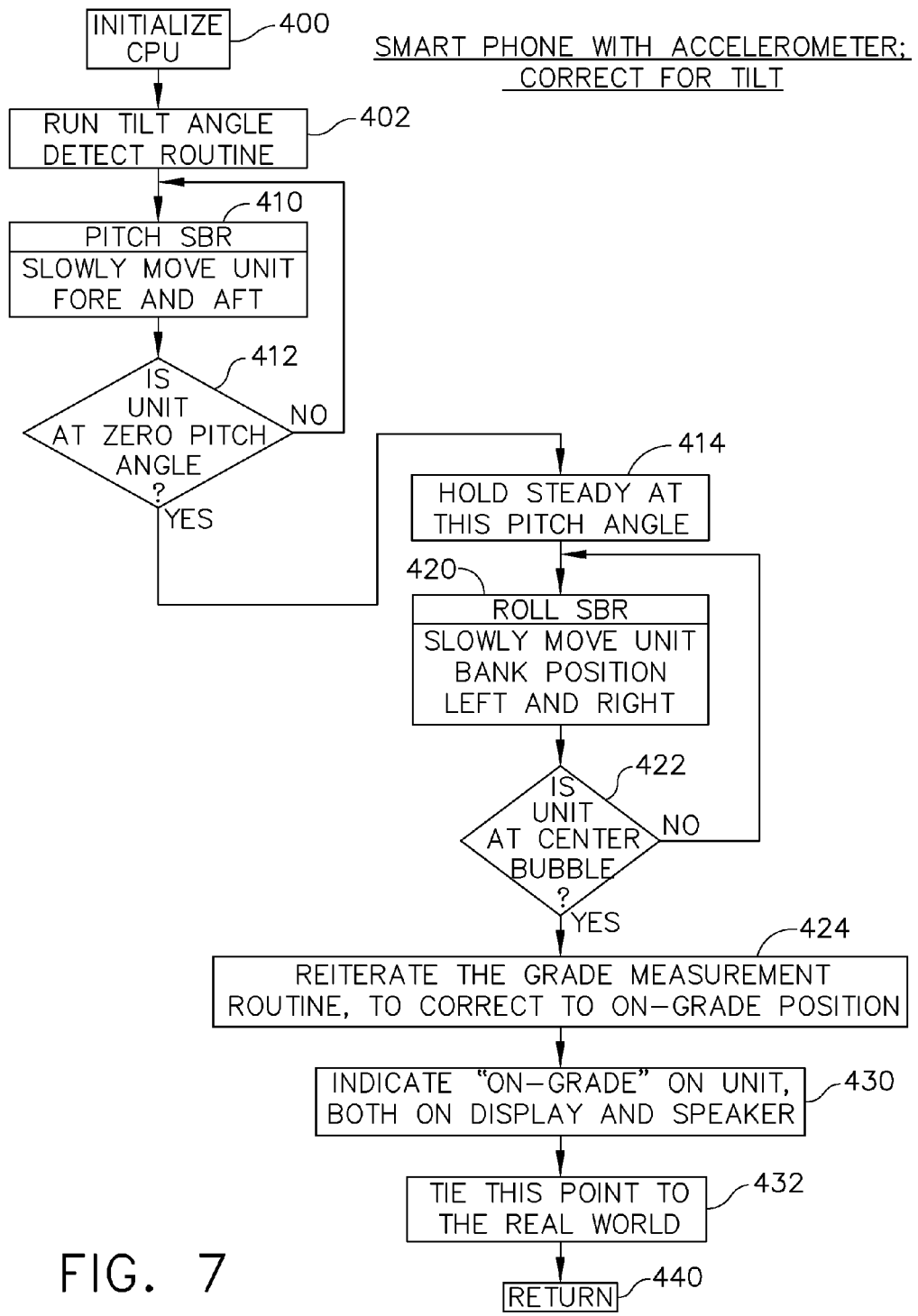
FIG. 7 is a flow chart of some of the important steps performed by a smart device running an application program ("APP"), in which the smart device of FIG. 4 uses accelerometers, for example, to perform the function of assisting a human user in correcting for any error in tilt angle, while the user is determining an on-grade position of the smart device with respect to the laser plane being emitted by the laser transmitter of FIG. 1. The accelerometers assist in determining whether the smart device is at a proper pitch angle and whether the smart device is at a proper roll angle. Deviations in the proper pitch and roll angles are indicated as visible and/or audible outputs for use by the human user in correcting those angles.

Referring now to FIG. 7, a logic flow chart is presented for use with a smart device or smart phone that includes some type of sensors, such as accelerometers, that can be used for correcting tilt angles. For this engineering application, the tilt angles of interest are the pitch angle and the roll angle of the smart device.

Beginning at an initialization step 400 that initializes the processing circuit of the smart device, the next step is to begin a routine 402 that detects the tilt angles of the smart device. The control logic is directed to a step 410 that begins a subroutine for determining the pitch angle. The user is now directed to slowly move the smart device in the fore and aft directions. A visual indicator will be presented on the display 150 to let the user know what the actual pitch angle is (see 630 on FIG. 10). A decision step 412 is used to determine if the unit is currently at a zero pitch angle. If not, then the user is directed to continue to slowly move the unit fore and aft until the pitch angle does reach zero, and at that time the logic result of decision step 412 will become YES. The logic flow is now directed to a step 414 where the user is directed to hold the smart device steady at this pitch angle.

The control logic now begins a subroutine that measures the roll angle, at a step 420. The user is directly to slowly move the smart device's bank position to the left and right. While this occurs, the user is to visually inspect the display 150 that will provide a roll indicator, in the form of a bubble as is typically seen on carpenter's levels. A decision step 422 is used for the user to determine if the unit is at center bubble, and if not, the logic flow is directed back to the step 420 where the user is directed to continue moving the bank position of the unit to the left and right. A particular visual display will be provided so the user can see the roll angle result, and an example of this is provided at 640 on FIG. 10. Once the unit is at center bubble, the logic result at decision step 422 will become YES, and the control logic can continue to the next step.

At a step 424, the user is directed to again find the on-grade position by reiterating the grade measurement routine (i.e., the routine of FIG. 6). The user must be careful to continue holding the smart device at the proper zero pitch angle and center bubble bank angle positions while doing this. Once the on-grade position has been found, the smart device will indicate "on-grade" at a step 430. At this point, the user is ready to tie this point to the real world at a step 432. There are at least two ways to do this: method #1 is to mark the physical site, and method #2 is to take a photograph of a grade rod at this particular point of interest. Some further details of these two methods for tying the point to the real world will now be discussed below.

Figure 8:
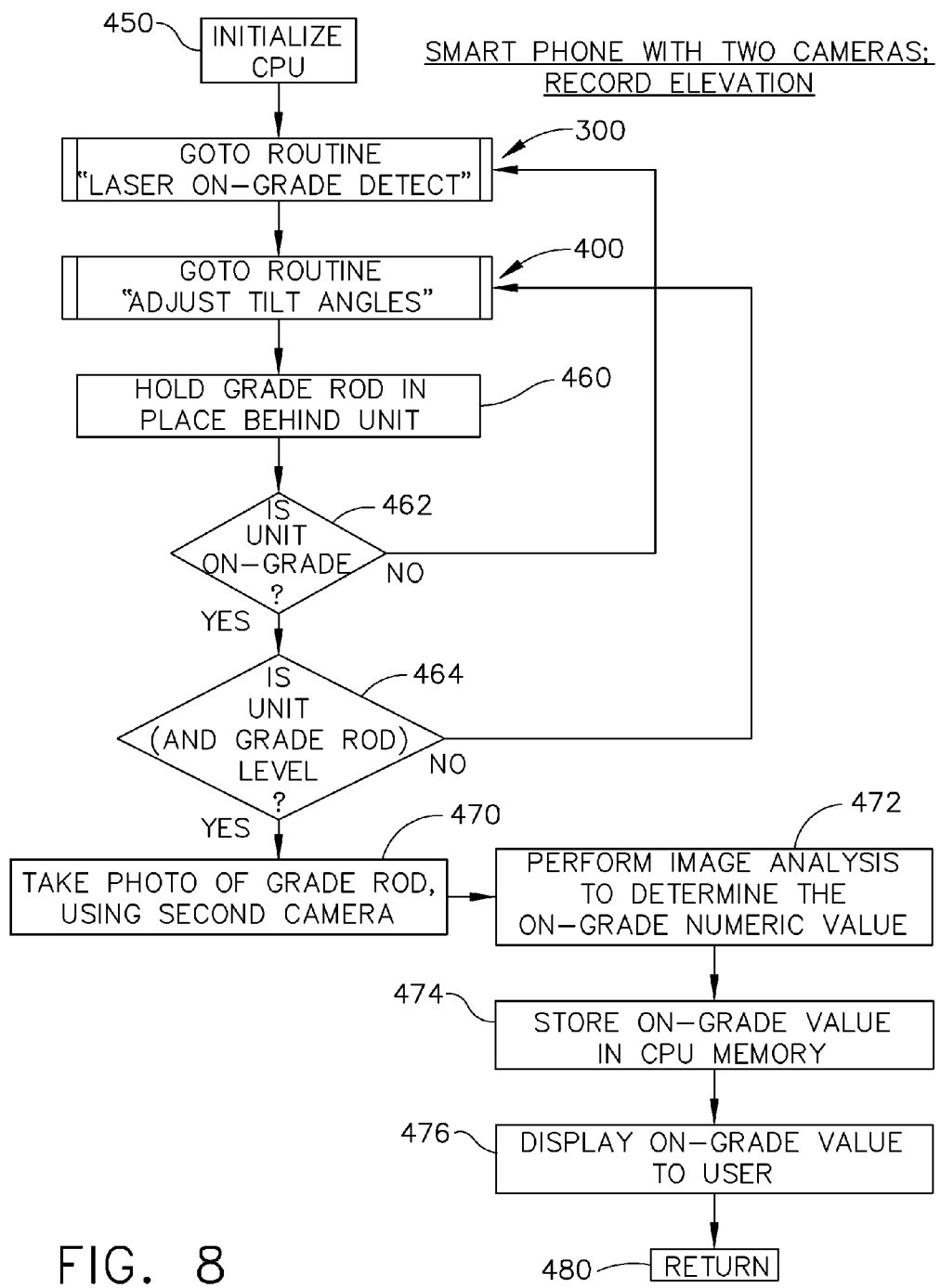
FIG. 8 is a flow chart of some of the important steps performed by a smart device running an application program ("APP"), in which the smart device of FIG. 5 uses two different cameras to detect the on-grade elevation of the laser plane (with the first camera) and to record the grade level by taking a photograph (with the second camera) of the grade rod's graduation markings In FIG. 8, it is assumed that the smart device not only has two cameras, but also has accelerometers that can be used to run the "laser on-grade detect" and the "adjust tilt angles" routines, which make the readings more accurate when establishing the grade rod position relative to the smart device.

Referring now to FIG. 8, a logic flow chart is provided for recording the elevation of a point of interest using a smart device or smart phone that has two cameras. In this routine, a grade rod is placed on the surface of the jobsite at a particular point of interest. It is desired that the grade rod be held vertically, and that will be up to the user to accomplish. However, certain routines of the APP program can be used to assist the user in holding the grade rod at the proper vertical position, as will be discussed below. Once the grade rod has been positioned, the user will slide the smart device up and down the grade rod at a fixed distance from the grade rod, while also looking to intercept the laser plane being emitted by the laser transmitter 10. In general, once the smart device intercepts the laser plane and becomes fixed at the on-grade elevation, the second camera of the smart device will take a picture of the grade rod to memorialize this on-grade elevation for this point of interest. A slideable bracket or clamp (not shown) could be attached to the grade rod that will also hold the smart device at a fixed distance from the face of the grade rod, and that would be quite useful for this routine. Such a bracket (or clamp) could be provided with a grade rod, or could be provided with the smart device. The bracket (or clamp) is not illustrated in the views, but it is well understood how such a bracket (or clamp) could be designed and used. See, for example, U.S. Pat No. 6,398,175, titled: METHOD AND APPARATUS FOR PROVIDING A LASER DETECTOR CLAMP APPARATUS WITH REVERSIBLE JAW ADAPTER (incorporated by reference herein, in its entirety), for a type of laser receiver clamp.

Beginning at an initialization step 450 that initializes the processing circuit of the smart device, the first thing to occur is to execute a routine that detects the on-grade position of the laser plane emitted by the laser transmitter. This overall routine is referred to by the reference numeral 300 on FIG. 8. This routine 300 represents the entire flow chart of FIG. 6, discussed above. Once that has occurred, then the logic flow is directed to a routine 400 that adjusts for the tilt angles. This routine 400 represents the entire logic flow depicted on FIG. 7.

It will be understood that the correction for tilt angles in step 400 is an optional choice by the user, and of course, that user must be running the subroutines of the APP program that displays the necessary information for adjusting the pitch angle and the roll angle. Once both the on-grade position has been detected and the tilt angles have been adjusted, the logic flow on FIG. 8 now arrives at a step 460, in which the user holds a grade rod in place behind the smart device (assuming that the second camera is on the opposite face of the smart device from the first camera). In essence, the user must hold the smart device in a manner so that the first camera is aimed at the laser transmitter, and the second camera is aimed at the grade rod, which has been now placed at a particular point of interest on the jobsite.

At this point in the logic flow, a decision step 462 asks the user whether or not the unit is currently on-grade. If not, then the user needs to go back to the routine 300 to correctly position the unit at the on-grade elevation. Once that has occurred successfully, a decision step 464 determines if the unit and the grade rod are level. What this is really asking is if the tilt angles have been adjusted by the routine 400. If not, the logic flow is directed back to that routine 400, until everything has been properly established for taking a measurement at this point of interest on the jobsite surface. Once the answers for both decision steps 462 and 464 are YES, the logic flow is directed to a step 470.

At step 470, the user will command the smart device to take a photograph of the grade rod using the second camera. That photograph is evidence of the on-grade elevation for that particular point of interest using that particular grade rod's set of gradations. That image could be used by itself, if desired. However, the APP program can also include additional routines to perform certain image analyses to help the user automate the recordation of this elevation for this point of interest.

The logic flow is directed to a step 472 in which the APP program now performs image analysis to determine the on-grade numeric value of the grade rod itself, looking at the image data from the digital photograph that was just taken of that grade rod. This step is where it is critical that the smart device is actually being held at the on-grade elevation, and also that the smart device is actually level (as determined by decision step 464). It is also important that the grade rod itself is being held in a vertical manner, and that the smart device is being held at a proper distance from the grade rod so that image data taken of the grade rod is consistent from one digital photograph to the next for different points of interest. This is where having a slideable mounting bracket (or clamp) that holds the smart device along the surface of the grade rod can be quite useful.

Once the on-grade numeric value has been determined at step 472, a step 474 will store that on-grade value in the memory circuit of the smart device. A step 476 now displays the numeric value of the on-grade result to the user on the smart device's display. Once that has occurred, this routine is finished and can return at a step 480 to other portions of the APP program.

Figure 9:
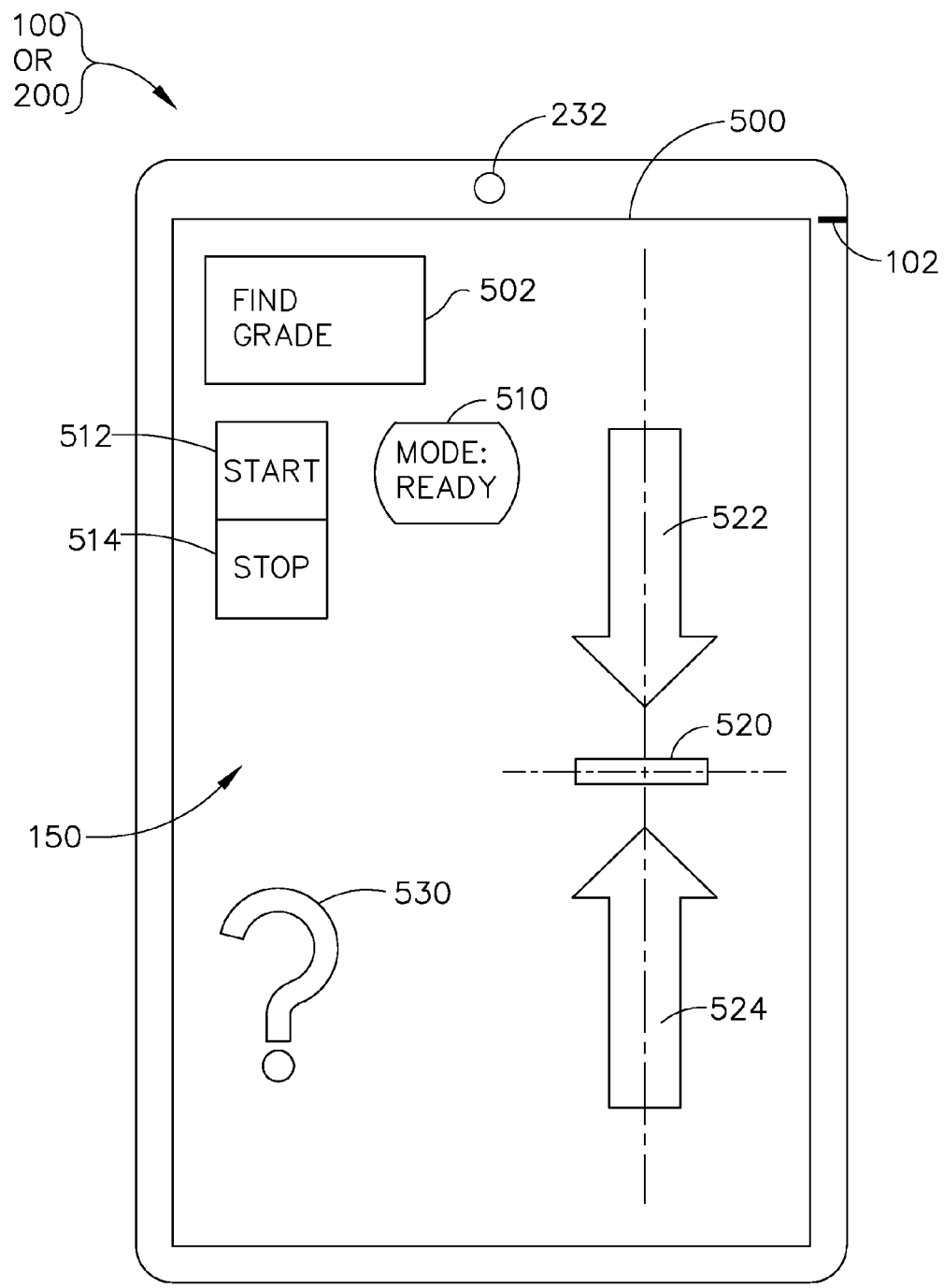
FIG. 9 is a diagrammatic view of an example visual display screen that is presented on the touchscreen display of the smart device of FIG. 1 or FIG. 2, for example, at a time when the operating mode is "Ready" for use in finding the on-grade elevation.

Referring now to FIG. 9, an example display is depicted for one of the smart devices 100 or 200, for use with the technology disclosed herein. In this view, a second camera 232 is illustrated, so this would be the second embodiment smart device 200. However, the type of display depicted on FIG. 9 could be used with either embodiment of the smart devices.

If the smart device 200 is a typical smart phone, then the display 150 will be a touch screen-type display. The illustrations of "buttons" are actual images on the display, and when those button areas are touched by the user, certain functions will be performed by the APP program. For example, the routine that is being displayed is the "Find Grade" routine, as depicted in the area 502 on the display. The operating mode is "Ready", as depicted by the area 510. There are Start and Stop buttons at 512 and 514, respectively, that the user can touch to either run or stop the execution of this portion of the APP program.

When the user is running the Find Grade routine, the camera (which is not seen in this view because it is on the opposite side of the housing) will be looking for the laser plane emitted by the laser transmitter 10. If the laser beam is not impacting the camera, then a question mark symbol such as that depicted at 530 could be displayed, visually informing the user that the smart device is completely unaware of the on-grade position. However, once the laser transmitter's light beam begins to impact on the camera, then the above grade, below grade, and on-grade symbols can be illuminated, as per the circumstances. The above grade symbol is at 522, the below grade symbol is at 524, and the on-grade symbol is at 520. These are typical symbols that are already in use with other laser transmitters sold by Trimble Navigation Limited. As discussed above, an audio output could also be provided, in which a speaker on board the smart phone announces audibly whether the status is above grade, below grade, or on-grade.

In the discussion above with regard to FIG. 7, the step 432 was to tie the elevation point into the real world for the point of interest on the jobsite surface. One way to do that was to mark the site physically. The symbol 102 on FIG. 9 represents some type of physical mark or notch in the case of the smart device 200, that will act as a reference point for the user to assist in physically marking the jobsite, which will represent a point that is a known distance from the on-grade elevation. The top of the display, depicted at the reference numeral 500, can help the user to extend (horizontally) the virtual line from the case of the smart device 200 to the physical piece of equipment or structure on the jobsite. It will be understood that if the mark 102 is used, then there will need to be some type of distance correction factor used to find the true on-grade elevation at that point of reference. It will be a known distance, however, because the user will have the necessary information for determining this corrective distance, which in essence is the distance between the center of the camera lens and the physical mark 102.

An alternative way of using the smart device is to not show the symbols 520, 522, and 524 on the display 150, but instead allow the user to simply use the camera function of the smart device for finding the on-grade laser plane. This mode might be the most useful for starting the procedure in any event. The user would aim the camera lens of the smart device toward the laser transmitter 10 until he can visually see the instrument in the field of view of the camera. The user then moves the smart device up and down (for a horizontal laser plane, as shown on FIG. 1), until the smart device crosses the laser beam. As this occurs, the user will observe the display as it is flooded with light from the laser transmitter. The user will also see that the intensity varies as the user sweeps through the laser plane. The desired "on-grade" is obtained at the peak observed intensity. This type of procedure would typically only work with very small camera lenses. However, such small lenses are the norm for smart phones and other types of smart devices that include a digital camera.

In another mode of using the smart device of FIG. 9, the user does not necessarily need to use a notch or mark, such as the indicia 102 on FIG. 9. The user could instead use the top edge of the case or housing of the smart device as the reference line. Of course, the user will then have to use a different correction factor that will account for the difference in elevation between the actual on-grade laser plane and the top of the case of the smart device.

Figure 10:
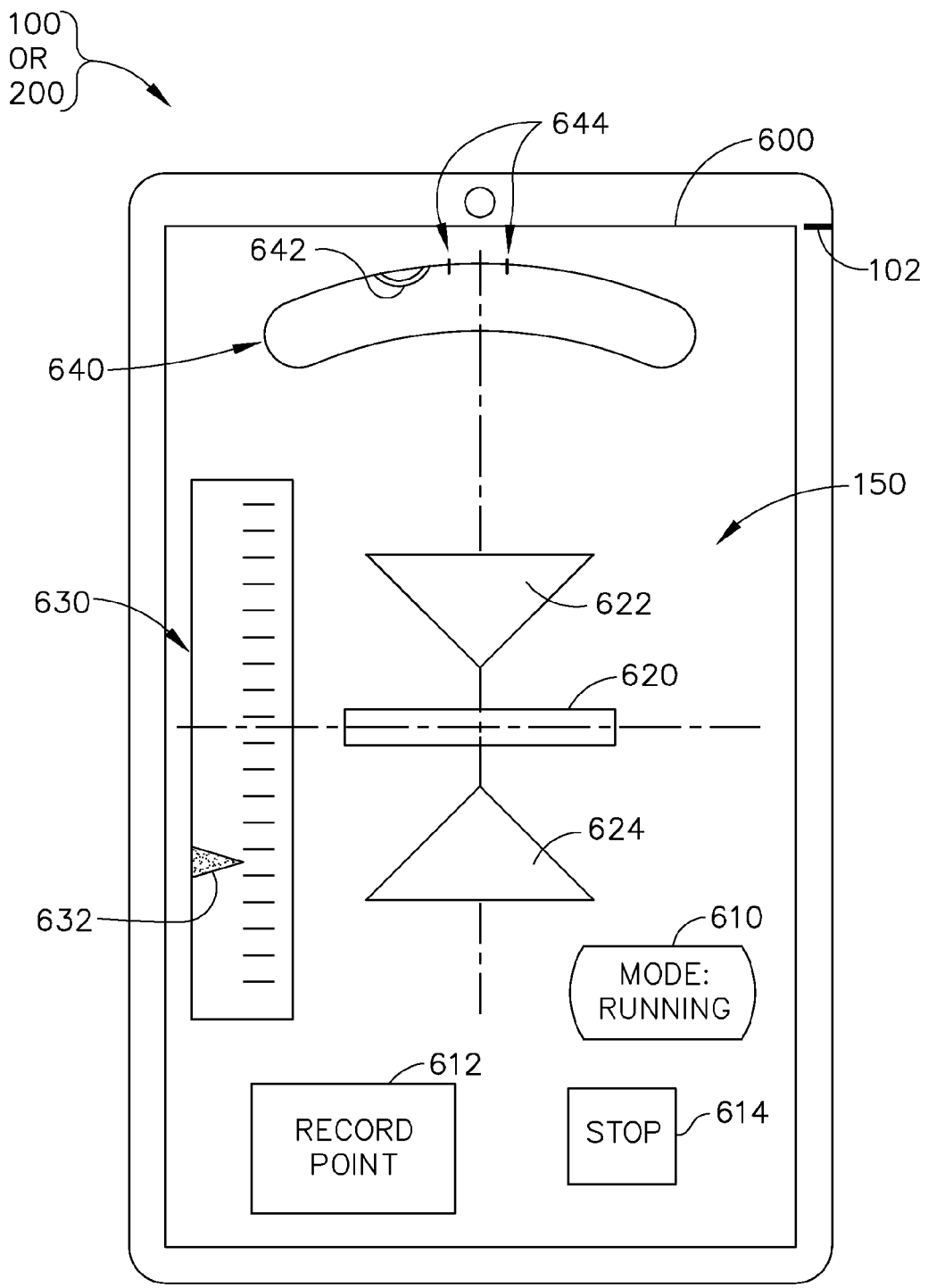
FIG. 10 is a diagrammatic view of an example visual display screen that is presented on the touchscreen display of the smart device of FIG. 1 or FIG. 2, for example, at a time when the operating mode is "Running" and is being used to find the on-grade elevation, while simultaneously correcting for tilt angle in both the roll and pitch directions with their own special indicators.

Referring now to FIG. 10, a different type of display is illustrated that can be used to simultaneously correct for the tilt angles in both the roll and pitch directions. On FIG. 10, the touch screen display is indicated at reference numeral 150, which has a top edge 600. The same reference mark 102 is again illustrated, for use in physically marking a structure with an on-grade position on the jobsite. This display also has certain areas that can be used as pushbuttons or other types of user input controls. On FIG. 10, the operating mode is "Running" as indicated at reference numeral 610. The Running routine can be stopped by depressing the area 614. The routine can be used to record a point of interest by depressing the area 612. Some of the other symbols on the exemplary display of FIG. 10 represent a status of, once again, above grade at 622, below grade at 624, and on-grade at 620.

In addition to the above symbols, there are some special indicators that are used to correct for tilt angle discrepancies. The pitch angle can be corrected by use of a pitch angle display 630, which has a current pitch indicator at 632. The user will be prompted to move the pitch angle of the smart device 200 back and forth until the pitch indicator 632 has reached the middle of the pitch angle indicator 630. At that point the pitch angle will have been corrected. The roll angle has an indicator at 640, which will have the appearance of a bubble-type measuring sensor or indicator, similar to what has been commonly used in carpenter's levels. The meniscus of the bubble is indicated at 642. There are two marks 644 that show the position where the bubble should ultimately become set in place, and at that time the roll angle will have been corrected. As discussed above, these pitch and roll angle corrections are part of a routine that is optional, but it is a very useful routine for this laser receiver application.

Figure 11:
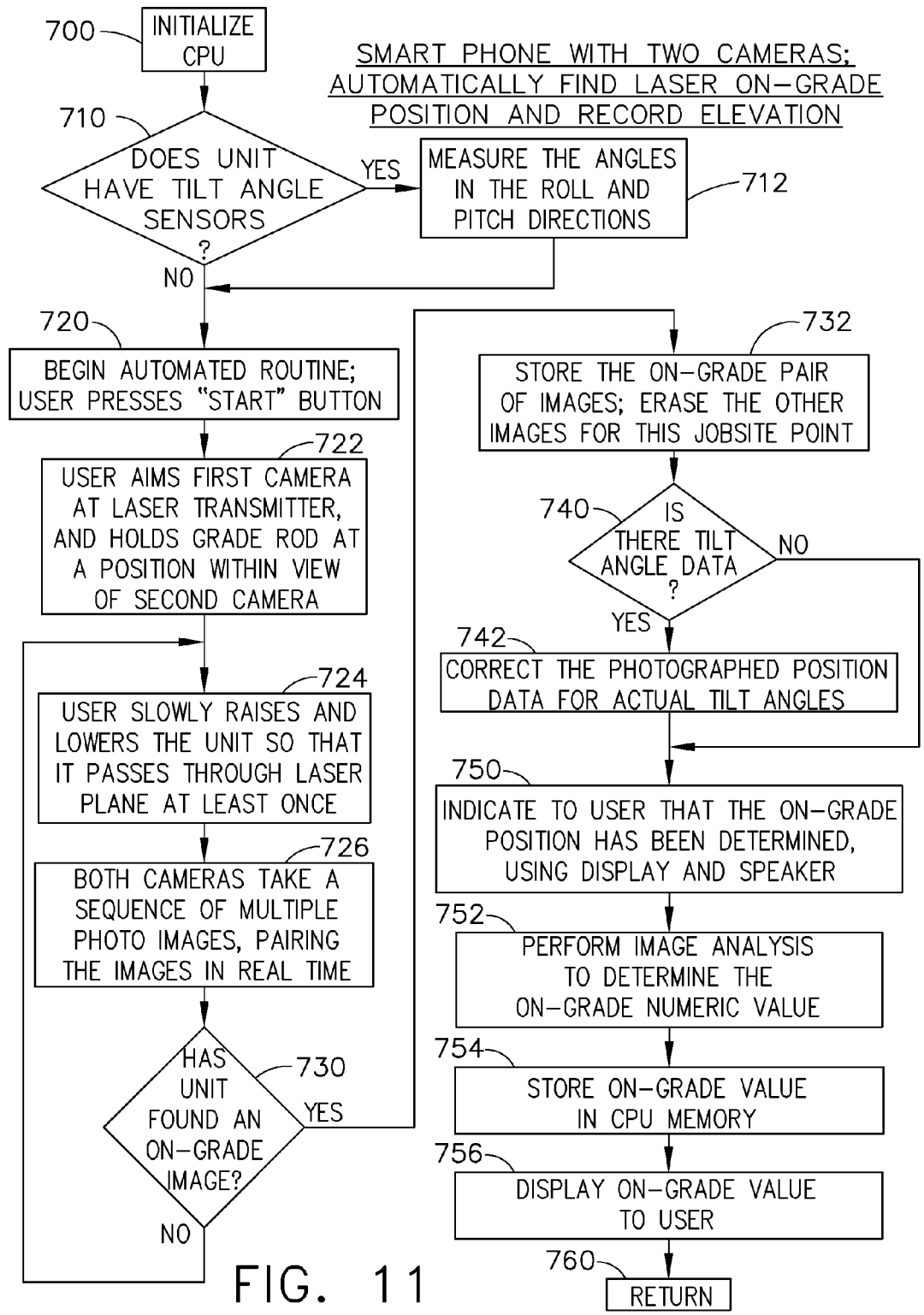
FIG. 11 is a flow chart of some of the important steps performed by a smart device running an application program ("APP"), in which the smart device of FIG. 5 uses two different cameras to detect the on-grade elevation of the laser plane (with the first camera) and to record the grade level by taking a photograph (with the second camera) of the grade rod's graduation markings.

Another enhancement of this technology is the possibility for automating the procedure for finding the on-grade position. On FIG. 8, the smart device had two cameras, and a separate grade rod was used for assisting the user in finding, and memorializing the location of the on-grade elevation at a specific point of interest (as selected by the user on the jobsite). One way to automate this procedure is the following; referring now to FIG. 11, the user will perform a somewhat similar procedure to that of FIG. 8, but with significant differences.

Beginning at a step 700 that initializes the processing circuit of the smart device, a decision step 710 determines if this smart device includes tilt angle sensors. If so, then a step 712 measures the tilt angles, in both the roll and pitch directions. That information will be used later in this procedure. Whether the tilt angle information is available or not, the user now begins the automated routine at a step 720, by pressing a "Start" button on the smart device. (This can be a physical pushbutton device, or more likely a virtual button on a touchscreen display. Moreover, if some type of position sensor, such as an accelerometer, is mounted on the smart device, the system could be designed such that a predetermined movement by the user would be interpreted by the smart device as acting as a "start" command; this could be a shaking movement, for example, in which the user quickly shakes the smart device up and down three times. In effect, the position sensor would become the "Start" button on the smart device.)

At a step 722, the user aims the first camera 130 at the laser transmitter, and places the grade rod 30 at a position where the second camera 232 can "see" that grade rod. Of course, the grade rod must be placed at a specific point of interest on the jobsite surface, so that step might occur first. At a step 724, the user now slowly raises and lowers the smart device 200 (assuming a horizontal, or near-horizontal laser plane) so that its first camera 130 passes through the plane of laser light at least once. (In a more general case, independent of the actual angle of the plane of laser light, the user will slowly move the smart device back and forth through that laser plane.) While this occurs, the smart device automatically takes a sequence of photographic images using both the first and second cameras; these images are paired by the APP program, such that each "first camera image" is mated (or "paired") with a corresponding "second camera image" so that both paired images are taken at virtually the same instant in real time. In other words, the paired images are both taken in near-real time. An actual calendar/clock time stamp is less important than the fact that the images are paired. Therefore, a "sequence time stamp" is recorded for each paired set of images; a calendar/clock time stamp can also be included in this record, if desired.

The processor 110 is programmed to determine when the smart device has acquired an "on-grade" image; this occurs when the laser light intensity is at a maximum value which is determined by comparing all of the images to one another that were taken by the first camera (only) during the sequence. When the specific image having the highest intensity is determined, a decision step 730 is satisfied and the logic flow is directed to a step 732. If a maximum value of the image is not found at decision step 732, then the logic flow is directed back to step 724 and the user continues to move the smart device up and down through the laser light plane (again, assuming a horizontal, or near-horizontal laser plane).

At step 732, the pair of "on-grade" images is stored by the smart device, and the other images for that sequence are erased. The APP has now found an image of the grade rod's graduation markings at the on-grade elevation for that point of interest on the jobsite. If the smart device includes position sensors (e.g., accelerometers) that can be used to determine the actual tilt angles of the unit while the images are being acquired, then the tilt angles can be measured and any tilt angle errors can be corrected by making a standard geometric calculation as to the effect of those angular errors on the on-grade image data of the grade rod. The final result will be a numeric value that is stored in memory of the smart device. To accomplish the above functions, a decision step 740 determines whether the tilt angle data was available at this sequence, using this smart device. If so, a step 742 corrects the position data, using the actual tilt angle measurements that occurred for that sequence time stamp.

At a step 750, the APP program now announces to the user that the on-grade position has been determined by the smart device. This announcement occurs using at least one of an audible message via a speaker, or a visual message that is displayed on the view screen. At a step 752, the APP program now performs image analysis to determine the on-grade numeric value of the grade rod itself, looking at the image data from the digital photograph that was just taken of that grade rod. (Note: this step could occur before the step 742 that corrects the photographed position data for tilt angle; it depends on how the system designed decides to program the APP.)

Once the on-grade numeric value has been determined at step 752, a step 754 will store that on-grade value in the memory circuit of the smart device. A step 756 now displays the numeric value of the on-grade result to the user on the smart device's display. Once that has occurred, this routine is finished and can return at a step 760 to other portions of the APP program.

It will be understood that the technology disclosed herein is useful for finding the on-grade elevation of a laser plane being emitted by a laser transmitter even if the smart device has no sensors other than the digital camera. In addition, this technology is still useful even if there is no second camera for recording images of a grade rod. In its most basic form, the smart device can be used with a single camera and without any types of sensors for automatically helping to correct for tilt angle discrepancies. The human user can essentially "eyeball" the tilt angles with a certain degree of accuracy, and take measurements of the on-grade elevations on a construction jobsite without additional assistance from the smart device. On the other hand, as noted above, the extra sensors are quite useful, especially for correcting the tilt angles; in addition, with the use of a second camera and a grade rod, the on-grade elevations can be automatically recorded, and those images can be used to determine a numeric value with respect to the grade rod position on the floor of the jobsite.

As noted above, the digital cameras mounted on board some smart devices are sensitive not only to visible light (i.e., in the spectra of wavelengths that a normal human eye can perceive), but are also somewhat sensitive to some infrared wavelengths. Such cameras would likely be more sensitive to the near-infrared wavelengths, for example. Using such cameras, the smart device 100 or 200 could not only be used with visible light laser transmitters (emitting either red or green laser light, for example), but possibly could be used with IR laser transmitters. Moreover, a possible improvement for such a camera would be to include a routine in the APP program that (more or less) "highlights" the infrared signals being received by the forward-facing digital camera. For example, the APP program could present the IR light in a false color on the viewfinder of the digital camera. Since most visible laser transmitters (in today's available equipment) use either red or green wavelengths, a possible false color to identify IR laser light could be a bright blue or cyan color on the smart device's viewfinder, for example—i.e., something that does not have the appearance of a normal object on a typical construction jobsite. As such, this is an optional feature that may not be used in most situations.

It will be understood that the term "on-grade" generally refers to a horizontal elevation on a jobsite, or any other type of physical site where a horizontal line (plane) reference is important for measurements or other types of position indications. However, laser transmitter and receiver systems can also work with angles other than horizontal; for example, the laser transmitter can be tilted at an angle from horizontal, for digging a graded ditch; or the laser transmitter can be tilted to the vertical, for defining a direction line (thereby creating a vertical "plane" of laser light, instead of a horizontal "plane"). For the purposes of this patent document, including the claims, the term "on-grade" includes any possible angle that may be emitted by a laser transmitter; similarly, the term "on-grade elevation" (or, merely "elevation") includes the meaning of a geometric plane that may not represent a true elevation, and in fact might represent a vertical plane that intersects all horizontal elevations. This also means that the terms "above grade" and "below grade" could have a different meaning than actually "above" or "below" a particular elevation, and instead could physically indicate a direction to the "left" or to the "right" of a vertical line (plane) of laser light.

It will be understood that the logical operations described in relation to the flow charts of FIGS. 6-8 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 110) to execute software instructions that are stored in memory cells within an ASIC. In fact, the entire microprocessor 110, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the APP program or data stored, for example, in memory circuit 180, or in 112), or perhaps by a type of memory device not yet invented.

It will also be understood that the precise logical operations depicted in the flow charts of FIGS. 6-8, and discussed above, could be somewhat modified to perform similar, although not exact, functions without departing from the principles of the technology disclosed herein. The exact nature of some of the decision steps and other commands in these flow charts can be directed toward specific existing and future models of smart phones and certainly similar, but somewhat different, steps would be taken for use with other models of iPOD systems, for example, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A computer system used for determining an on-grade elevation on a jobsite, said system comprising:
    (a) a smart device, having a processing circuit, a memory circuit, an input/output circuit, an electronic camera with a plurality of photosensors, an electronic viewfinder that is visible to a human user, at least one sensor for detecting physical movement of said smart device, and at least one of a display or an audio output device;
    (b) a laser transmitter that emits at least one laser beam in at least one predetermined direction, and creates an effective plane of laser light at an elevation which is defined as being On-Grade;
    (c) wherein: while said human user attempts to place said smart device in a location so as to intercept said effective plane of laser light, said processing circuit is configured to display an image on said electronic viewfinder, based on electromagnetic radiation signals that impact said electronic camera, and said image is viewable by said human user to provide a coarse position for placing said smart device within said effective plane of laser light; and
    (d) wherein: said processing circuit is further configured to determine if said effective plane of laser light is impacting said electronic camera at a more fine position, and if so, based upon a first signal from said at least one sensor, to determine if said smart device is moving up, down, or is being held still, and if said smart device is physically held still at the On-Grade elevation, then to indicate that said smart device is On-Grade, using said at least one of a display or an audio output device.

2. The system of claim 1, wherein:
    (a) when said processing circuit is determining if said effective plane of laser light is impacting said electronic camera at a more fine position; and
    (b) if so, based upon a first signal from said at least one sensor, to determine if said smart device is moving up, down, or is being held still, and:
        (i) if moving up, to indicate that said smart device is Above Grade, using said at least one of a display or an audio output device; or
        (ii) if moving down, to indicate that said smart device is Below Grade, using said at least one of a display or an audio output device; or
        (iii) if being held still, to indicate that said smart device is On-Grade, using said at least one of a display or an audio output device.

3. The system of claim 1, wherein said at least one sensor for detecting physical movement of said smart device comprises an accelerometer.

4. The system of claim 1, wherein said at least one of a display or an audio output device comprises a touch screen display that shows a plurality of visible symbols to said human user, including at least three symbols: (i) for Above Grade, (ii) for Below Grade, and (iii) for On-Grade.

5. The system of claim 1, wherein said at least one of a display or an audio output device comprises a speaker that emits a plurality of audio signals to said human user, including at least three distinct audio sounds: (i) for Above Grade, (ii) for Below Grade, and (iii) for On-Grade.

6. The system of claim 2, wherein: said processing circuit is further configured:
    (a) based upon said first signal from said at least one sensor, to determine if said smart device is moving up or down; and
    (b) to assist said human user to place said smart device at said On-Grade elevation at a more refined position, by indicating a very slow and short movement direction to said human user, by:
        (i) if moving up, indicating that said smart device is Below Grade, using said at least one of a display or an audio output device; or
        (ii) if moving down, indicating that said smart device is Above Grade, using said at least one of a display or an audio output device.

7. The system of claim 6, wherein said at least one of a display or an audio output device comprises a touch screen display that shows a plurality of visible symbols to said human user, including at least three symbols: (i) for Close Above Grade, (ii) for Close Below Grade, and (iii) for On-Grade.

8. The system of claim 1, further comprising: a second sensor for detecting a physical tilt angle of said smart device, and a third sensor for detecting a physical roll angle of said smart device;
    wherein: said processing circuit is further configured:
    (a) based upon a second signal from said second sensor, to determine a present tilt angle of said smart device, and to indicate said present tilt angle using said at least one of a display or an audio output device; and
    (b) based upon a third signal from said third sensor, to determine a present roll angle of said smart device, and to indicate said present roll angle using said at least one of a display or an audio output device.

9. A computer system used for determining an on-grade elevation on a jobsite, said system comprising:
    (a) a smart device, having a processing circuit, a memory circuit, an input/output circuit, a first electronic camera with a plurality of photosensors, a second electronic camera with a plurality of photosensors, an electronic viewfinder that is visible to a human user, and a user-controlled input device, wherein said first electronic camera is mounted on said smart device so as to face in a first direction and said second electronic camera is mounted on said smart device so as to face in a second direction in which said first direction is different than said second direction;

(b) a laser transmitter that emits at least one laser beam in at least one predetermined direction, and creates an effective plane of laser light at an elevation which is defined as being On-Grade;

(c) a grade rod having visible graduations along its longitudinal axis, said grade rod being placed at said jobsite on the opposite side of said smart device from said laser transmitter;

(d) wherein: while said human user attempts to place said smart device in a location and first orientation so as to intercept said effective plane of laser light, said processing circuit is configured to display an image on said electronic viewfinder, based on electromagnetic radiation signals that impact said first electronic camera, and said image is viewable by said human user to provide a position for placing said smart device within said effective plane of laser light, which will be designated as an On-Grade position;

(e) wherein: while maintaining said smart device in said first orientation, upon activation of said user-controlled input device by said human user, said processing circuit is further configured to: (i) receive a signal from said user-controlled input device, (ii) then to activate said second electronic camera which acquires an image of said grade rod, and (iii) to store said image in said memory circuit.

10. The system of claim 9, wherein said processing circuit is further configured to perform image analysis on said image that was stored in said memory circuit, thereby capturing a numeric value for said On-Grade elevation with respect to said grade rod.

11. The system of claim 10, further comprising a display on said smart device, and wherein said processing circuit is further configured to display said numeric value for said On-Grade elevation.

12. The system of claim 9, further comprising a display on said smart device, and wherein said processing circuit is further configured to display said image.

13. The system of claim 12, further comprising: a first sensor for detecting a physical tilt angle of said smart device, and a second sensor for detecting a physical roll angle of said smart device;
wherein: said processing circuit is further configured:
(a) based upon a first signal from said first sensor, to determine a present tilt angle of said smart device, and to indicate said present tilt angle using said at least one of a display or an audio output device;
(b) based upon a second signal from said second sensor, to determine a present roll angle of said smart device, and to indicate said present roll angle using said at least one of a display or an audio output device; and
(c) upon activation of said user-controlled input device by said human user: (i) to activate said second electronic camera which acquires a roll-angle and tilt-angle corrected image of said grade rod, and (ii) to display said roll-angle and tilt-angle corrected image.

14. The system of claim 9, further comprising: a first sensor for detecting a physical tilt angle of said smart device, and a second sensor for detecting a physical roll angle of said smart device;
wherein: said processing circuit is further configured:
(a) based upon a first signal from said first sensor, to determine a present tilt angle of said smart device, and to indicate said present tilt angle using said at least one of a display or an audio output device;
(b) based upon a second signal from said second sensor, to determine a present roll angle of said smart device, and to indicate said present roll angle using said at least one of a display or an audio output device; and
(c) upon activation of said user-controlled input device by said human user: (i) to activate said second electronic camera which acquires a roll-angle and tilt-angle corrected image of said grade rod, and (ii) to store said roll-angle and tilt-angle corrected image in said memory circuit.

15. The system of claim 9, wherein said first direction is substantially opposite said second direction.

16. A method for determining an on-grade elevation on a jobsite, said method comprising:
(a) providing a smart device, having a processing circuit, a memory circuit, an input/output circuit, an electronic camera with a plurality of photosensors, an electronic viewfinder that is visible to a human user, an output device that is (i) visible, or (ii) audible, or (iii) visible and audible, and an outer housing having a physical feature for visibly indicating a predetermined elevation with respect to said electronic camera;
(b) providing a laser transmitter that emits at least one laser beam in at least one predetermined direction, and thereby creates an effective plane of laser light at an elevation which is defined as being On-Grade;
(c) attempting to place said smart device in a location so as to intercept said effective plane of laser light, by:
(i) displaying, under the control of said processing circuit, an image on said electronic viewfinder, based on electromagnetic radiation signals that impact said electronic camera; and
(ii) viewing said image so as to provide a coarse position for placing said smart device within said effective plane of laser light; and
(d) moving said smart device in smaller distance increments so as to find a more fine position where said effective plane of laser light is impacting said electronic camera, by:
(i) while viewing said image on said electronic viewfinder, slowly moving said smart device up and down until centering said effective plane of laser light onto said camera, as determined by said human user;
(ii) holding said smart device still after said smart device has been centered, and designating that position as being On-Grade; and
(e) using said physical feature of said outer housing of said smart device as a reference position, and marking that position on said jobsite to thereby indicate a relative On-Grade elevation.

17. The method of claim 16, wherein said step of marking a relative On-Grade elevation comprises one of: (a) placing a mark directly at said On-Grade elevation; and (b) placing a mark at a position that is offset by a predetermined distance, wherein said predetermined distance is determined by said human user.

18. The method of claim 16, wherein said step of marking a relative On-Grade elevation comprises one of: (a) placing a mark directly at said On-Grade elevation; and (b) placing a mark at a position that is offset by a predetermined distance, wherein said predetermined distance corresponds to said predetermined elevation that is with respect to said electronic camera.

19. The method of claim 16, while moving said smart device in smaller distance increments so as to find a more fine position, further comprising the steps of:
   (a) by using image pixel data that is created by said electronic camera, determining whether said smart device is Above Grade, or Below Grade, or On-Grade, and based upon that determination:
   (b) if Above Grade, then indicating said smart device is Above Grade, using said at least one of a display or an audio output device; or
   (c) if Below Grade, then indicating said smart device is Below Grade, using said at least one of a display or an audio output device; or
   (d) if On-Grade, then indicating said smart device is On-Grade, using said at least one of a display or an audio output device.

20. The method of claim 19, wherein said step of using pixel data to determine whether said smart device is Above Grade, or Below Grade, or On-Grade comprises the steps of:
   (a) if a density of said pixel data is substantially centered at said plurality of photosensors of said electronic camera, then determining said smart device is On-Grade; or
   (b) if a density of said pixel data is above a horizontal centerline of said plurality of photosensors of said electronic camera, then determining said smart device is Below Grade; or
   (c) if a density of said pixel data is below said horizontal centerline of said plurality of photosensors of said electronic camera, then determining said smart device is Above Grade.

21. The method of claim 19, while moving said smart device in yet smaller distance increments so as to find a more refined position, further comprising the steps of:
   (a) by using image pixel data that is created by said electronic camera, determining whether said smart device is Close Above Grade, or Close Below Grade, or On-Grade, and based upon that determination:
   (b) if Close Above Grade, then indicating said smart device is Close Above Grade, using said at least one of a display or an audio output device; or
   (c) if Close Below Grade, then indicating said smart device is Close Below Grade, using said at least one of a display or an audio output device; or
   (d) if On-Grade, then indicating said smart device is On-Grade, using said at least one of a display or an audio output device.

22. A computer system used for determining an on-grade elevation on a jobsite, said system comprising:
   (a) a laser transmitter that emits at least one laser beam in at least one predetermined direction, and creates an effective plane of laser light at an elevation which is defined as being On-Grade;
   (b) a grade rod having visible graduations along its longitudinal axis, said grade rod being placed at a user-selected point of interest of said jobsite; and
   (c) a smart device, having a processing circuit, a memory circuit, an input/output circuit, a first electronic camera with a plurality of photosensors, and a second electronic camera with a plurality of photosensors, wherein said first electronic camera is mounted on said smart device so as to face in a first direction and said second electronic camera is mounted on said smart device so as to face in a second direction, in which said first direction is different than said second direction;
   (d) wherein: a user holds said smart device such that said first direction is generally facing said laser transmitter and said second direction is generally facing said grade rod;
   (e) wherein said processing circuit is configured:
      (i) to detect a Start command;
      (ii) using said first and second electronic cameras, to initiate a sequence by photographing a plurality of images while said user moves said smart device through said effective plane of laser light;
      (iii) to create a plurality of paired images, such that each image taken by said first electronic camera is paired with a corresponding image taken in near-real time by said second electronic camera;
      (iv) to measure an intensity of each of said plurality of images taken by said first electronic camera, and to determine which of said first electronic camera images had a maximum value of intensity as compared to all other of said first electronic camera images;
      (v) to select said first electronic camera image which exhibited said maximum value of intensity, along with its corresponding paired second electronic camera image showing said grade rod, and designating those images as an On-Grade pair;
      (vi) from said On-Grade pair of images, to store said second electronic camera image in said memory circuit; and
      (vii) to terminate said sequence of photographing said plurality of images.

23. The computer system of claim 22, wherein said processing circuit is further configured to perform image analysis on said second electronic camera image that was stored in said memory circuit, thereby capturing a numeric value for said On-Grade elevation with respect to said grade rod.

24. The computer system of claim 22, further comprising: at least one sensor for detecting at least one of: (a) a physical tilt angle of said smart device, and (b) a physical roll angle of said smart device;
   (c) wherein, said processing circuit is further configured:
      (i) to calculate a correction value for at least one of said physical tilt angle of said smart device and said physical roll angle of said smart device; and
      (ii) to apply said correction value to an indicated On-Grade position that was stored in said second electronic camera image.

* * * * *